US009703818B1

(12) United States Patent
Clauer et al.

(10) Patent No.: US 9,703,818 B1
(45) Date of Patent: Jul. 11, 2017

(54) AUTOMATIC COMPARISON OF ENTERPRISE PROFILE ANALYTICS

(71) Applicant: International Business Machines Corporation, Armonk, NY (US)

(72) Inventors: Lynn M. Clauer, Saint George, VT (US); Robert M. Mireault, Williston, VT (US); Debra J. White, Cold Spring, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/970,997

(22) Filed: Dec. 16, 2015

(51) Int. Cl.
*G06F 17/30* (2006.01)
(52) U.S. Cl.
CPC .. *G06F 17/30321* (2013.01); *G06F 17/30867* (2013.01)
(58) Field of Classification Search
CPC combination set(s) only.
See application file for complete search history.

(56) References Cited

U.S. PATENT DOCUMENTS

| 6,968,314 | B1 | 11/2005 | White et al. | |
|---|---|---|---|---|
| 9,032,360 | B1 | 5/2015 | Cohen et al. | |
| 9,134,961 | B1 | 9/2015 | Cohen et al. | |
| 2005/0132228 | A1* | 6/2005 | Ende | G06F 21/604 726/4 |
| 2006/0229896 | A1* | 10/2006 | Rosen | G06Q 10/1053 705/321 |
| 2007/0276685 | A1* | 11/2007 | Raupers | G06Q 10/10 379/88.22 |
| 2011/0178964 | A1 | 7/2011 | Tseng et al. | |
| 2012/0330567 | A1* | 12/2012 | Bauer | G06F 19/22 702/20 |
| 2013/0332324 | A1* | 12/2013 | Mischell | G06Q 40/123 705/30 |
| 2014/0136940 | A1* | 5/2014 | Breslau | G06F 3/04895 715/227 |

OTHER PUBLICATIONS

Anonymous, "SAP SAGA (Security & Authorization Group Accelerator) Solution"; Jan. 9, 2013, pp. 1-6, An IP.com Prior Art Database Technical Disclosure; http://priorart.ip.com/IPCOM/000224887, United States.
Anonymous, "System and Method of Conquering Path Collection in Production Environments (Optimal tracing profile, divided and conquer, and parallel tracing)", Jun. 26, 2013, pp. 1-7, An IP.com Prior Art Database Technical Disclosure; http://priorart.ip.com/IPCOM/000228638, United States.
(Continued)

*Primary Examiner* — Shyue Jiunn Hwa
(74) *Attorney, Agent, or Firm* — Sherman IP LLP; Kenneth L. Sherman; Steven Laut

(57) ABSTRACT

A method includes storing, in a memory, a first Systems, Applications, Products (SAP) profile including first information. The method further includes storing, in the memory, a second SAP profile including second information. A processor compares the first information with the second information on a line-by-line basis. A reporting data structure is generated that includes a visual line-by-line result of the comparing.

14 Claims, 8 Drawing Sheets

(56) References Cited

OTHER PUBLICATIONS

Anonymous, "SAP Security Scanning Solution", Oct. 29, 2014, pp. 1-6, An IP.com Prior Art Database Technical Disclosure; http://ip.com/IPCOM/000239320, United States.

Scooter Software, Inc., "Intelligent Comparison", Scooter Software: Home of Beyond Compare, Sep. 4, 2014, pp. 1-10, Scooter Software, http://www.scootersoftware.com/features.php, United States.

Mell, P., et al., "The NIST Definition of Cloud Computing", National Institute of Standards and Technology Special Publication 800-145, Sep. 2011, pp. 1-7, U.S. Department of Commerce, United States.

List of IBM Patents or Applications Treated as Related.

\* cited by examiner

AUTOMATIC COMPARISON OF ENTERPRISE PROFILE ANALYTICS

BACKGROUND

Systems, Applications, Products (SAP) software is commonly implemented in many different types of business environments and networks. In order to use SAP's software productively, the implementers go through many steps of planning, preparation, deployment, post-installation, configuration and customization. SAP software provides the capability to manage financial, asset and cost accounting, production operations and materials, personnel, plants and archived documents.

SUMMARY

Embodiments of the invention relate to comparisons between profiles and generating a reporting data structure including a line-by-line result of the comparison. In one embodiment, a method includes storing, in a memory, a first Systems, Applications, Products (SAP) profile including first information. The method further includes storing, in the memory, a second SAP profile including second information. A processor compares the first information with the second information on a line-by-line basis. A reporting data structure is generated that includes a visual line-by-line result of the comparing.

These and other features, aspects and advantages of the present invention will become understood with reference to the following description, appended claims and accompanying figures.

DETAILED DESCRIPTION

Figure 1:
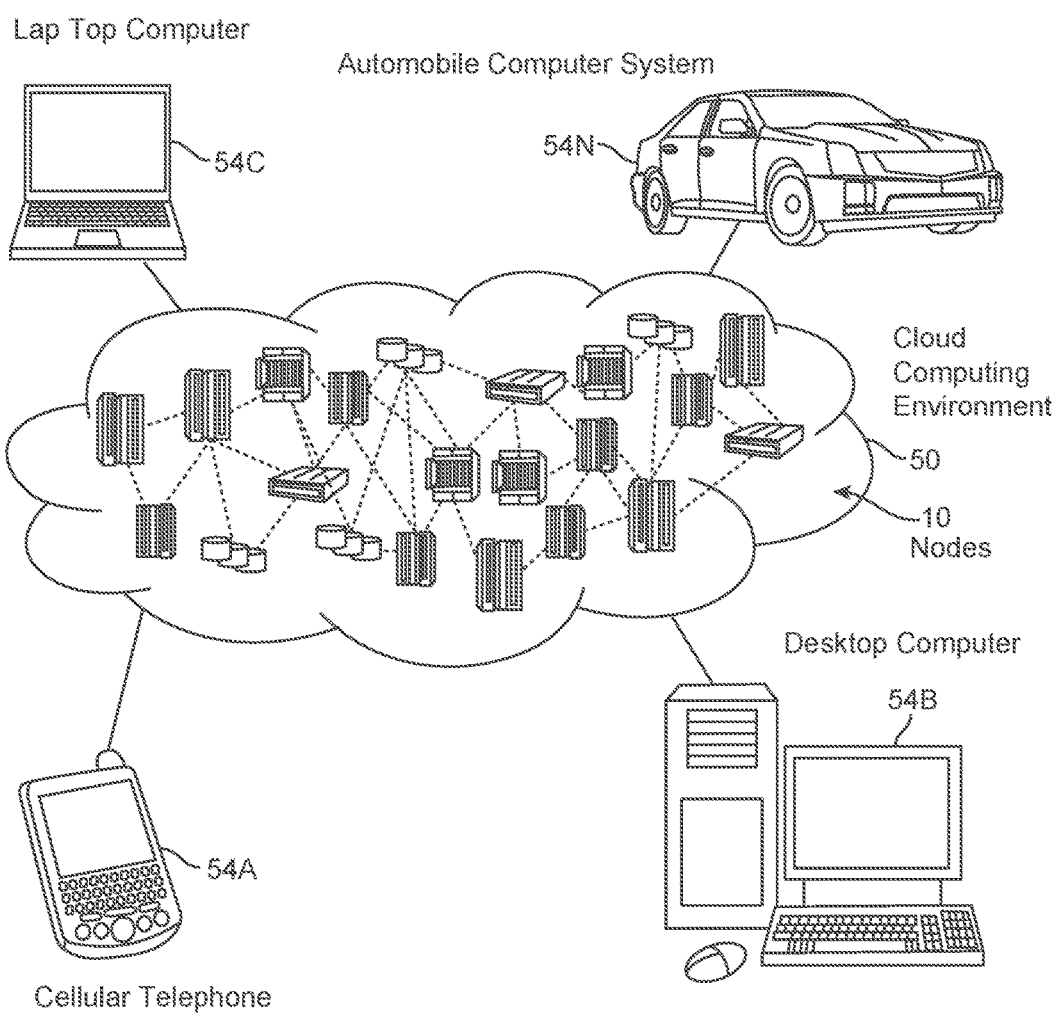
FIG. 1 depicts a cloud computing environment, according to an embodiment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 2:
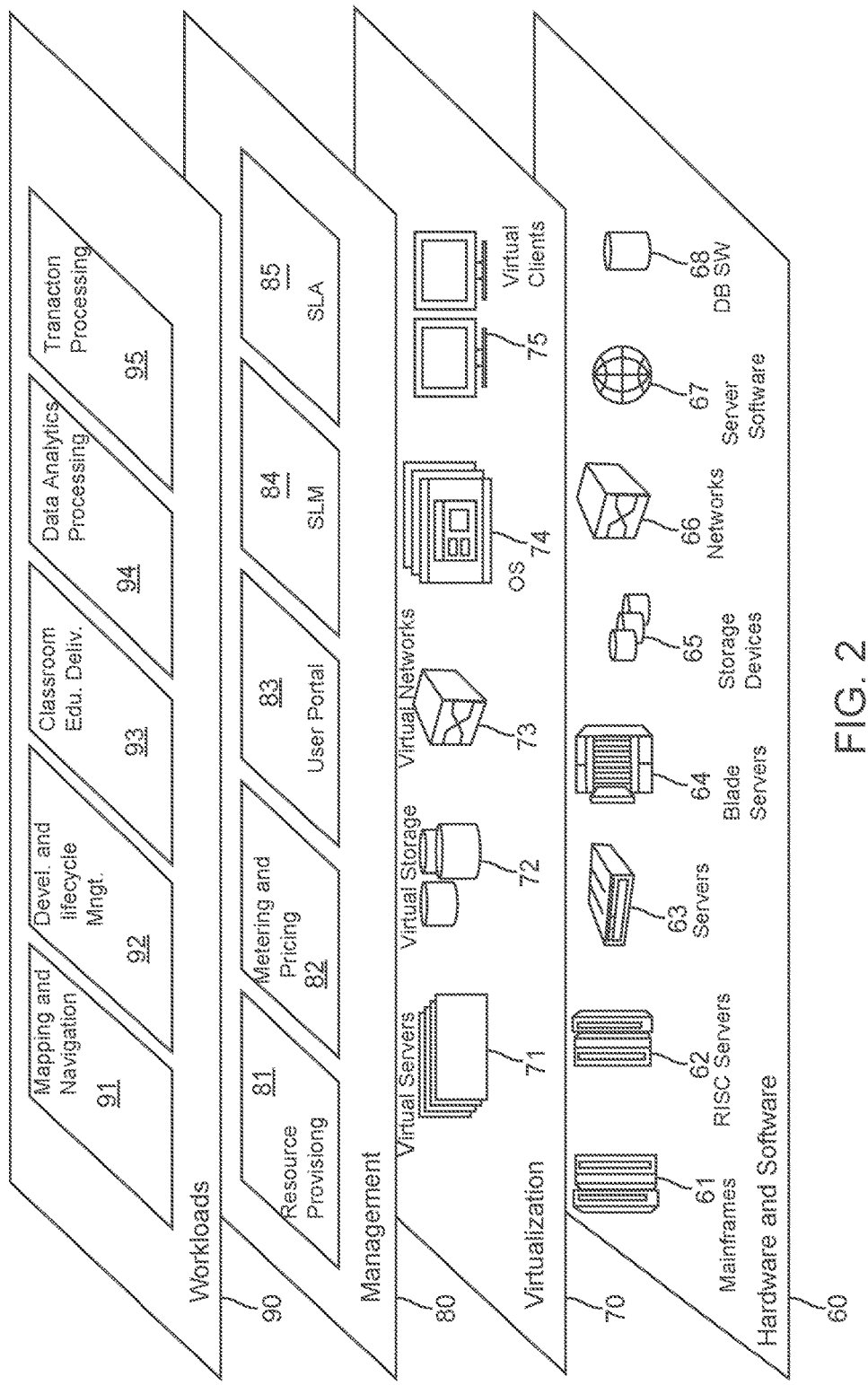
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95. As mentioned above, all of the foregoing examples described with respect to FIG. 2 are illustrative only, and the invention is not limited to these examples.

It is understood all functions of one or more embodiments as described herein may be typically performed in the network 300 (FIG. 3), performed by the system 400 (FIG. 4), or performed by the processing system 500 (FIG. 5), which can be tangibly embodied as hardware processors and with modules of program code. However, this need not be the case. Rather, the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments of the present invention may be implemented with any type of clustered computing environment now known or later developed.

Figure 3:
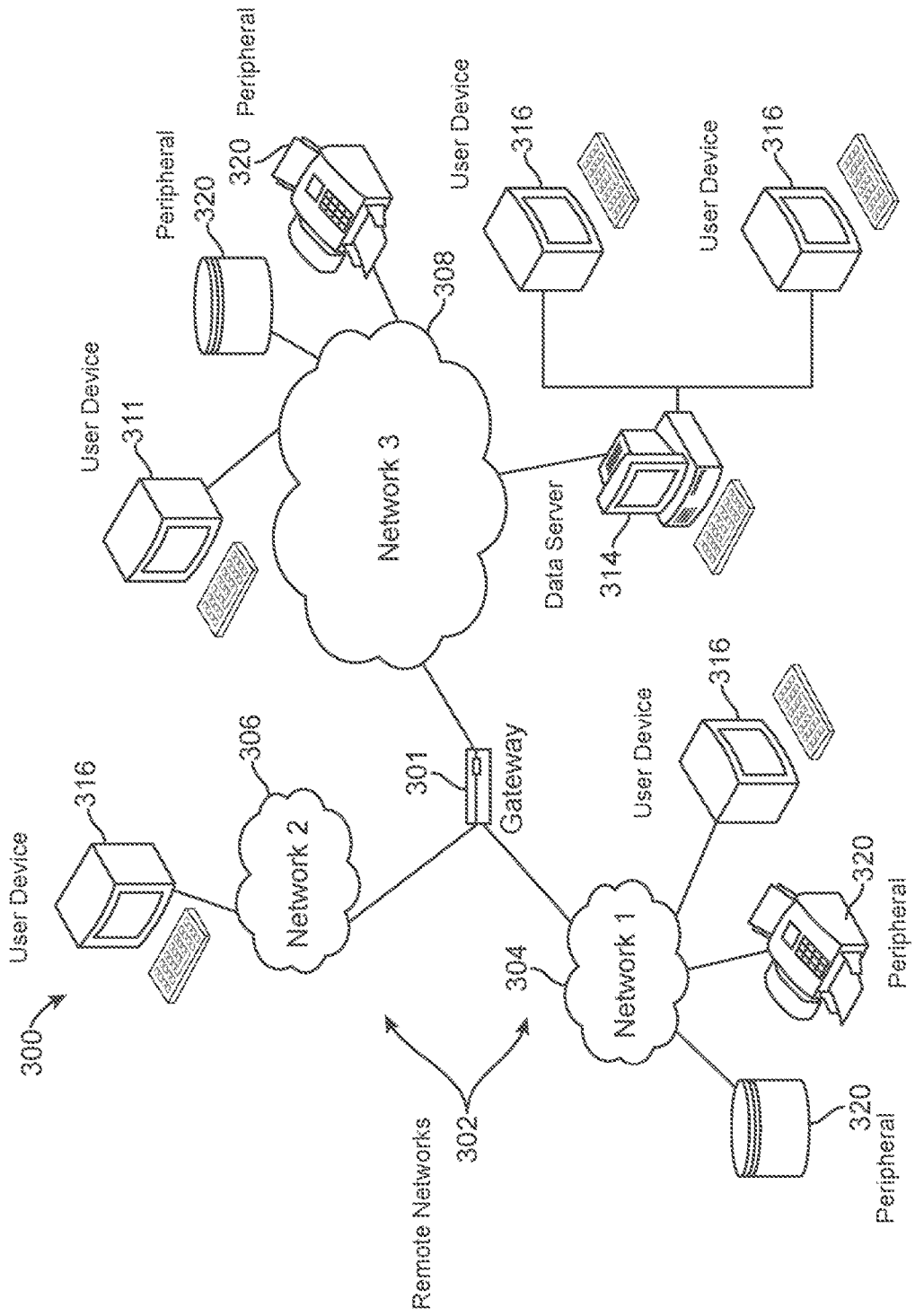
FIG. 3 is a network architecture for storing and recovering data for fast durability and quick journal-less recovery, according to an embodiment of the present invention.

FIG. 3 illustrates a network architecture 300, in accordance with one embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc. In one embodiment, the network architecture 300 includes one or more enterprise networks including an SAP system with enterprise software applications. In one embodiment, the network architecture 300 includes a process for automatic profile analytics and feedback. In one example, the automatic profile analytics and feedback process operates on and with SAP profiles that include a configuration of SAP system settings defining user access and parameters that ultimately constrain the view and authorization across the highly complex web of enterprise data and function within the SAP system.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 311 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

Figure 4:
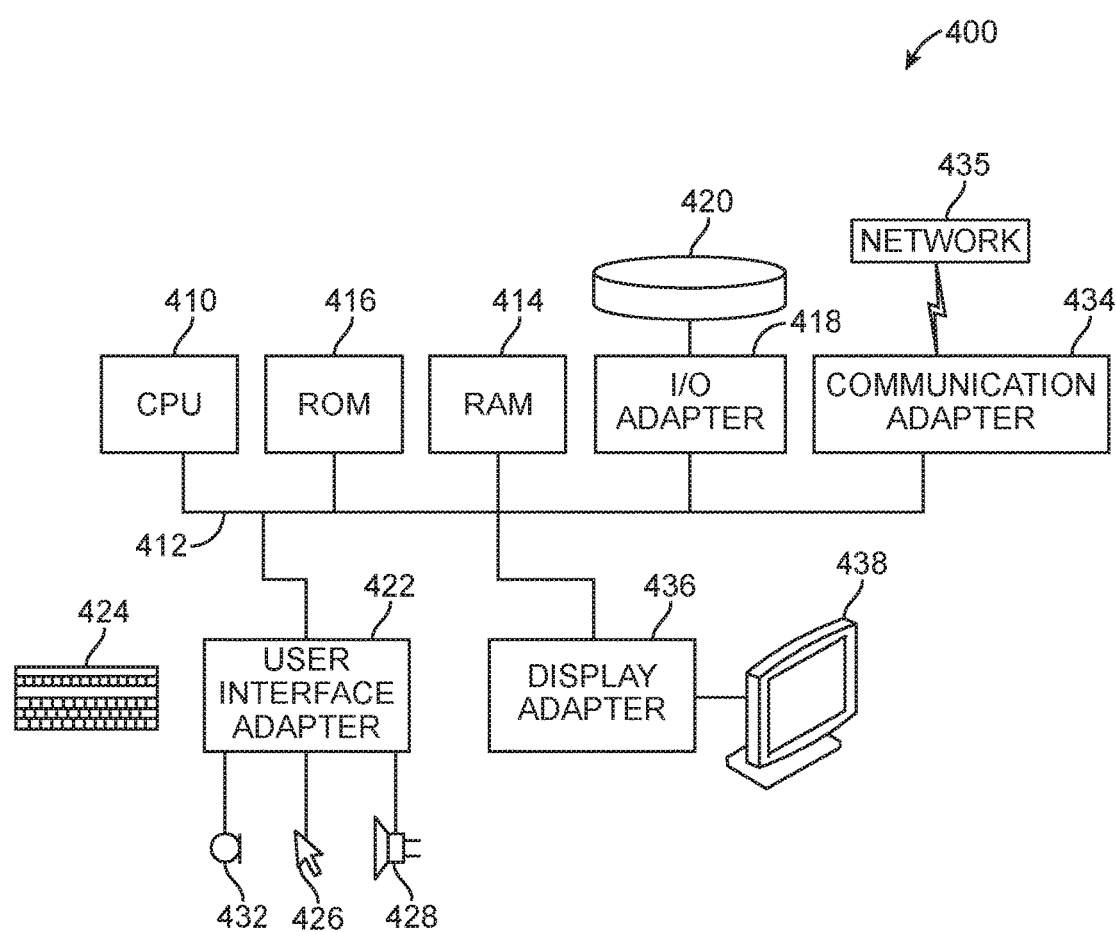
FIG. 4 shows a representative hardware environment that may be associated with the servers and/or clients of FIG. 1, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT WINDOWS Operating System (OS), a MAC OS, a UNIX OS, etc. In one embodiment, the system 400 employs a POSIX® based file system. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

Figure 5:
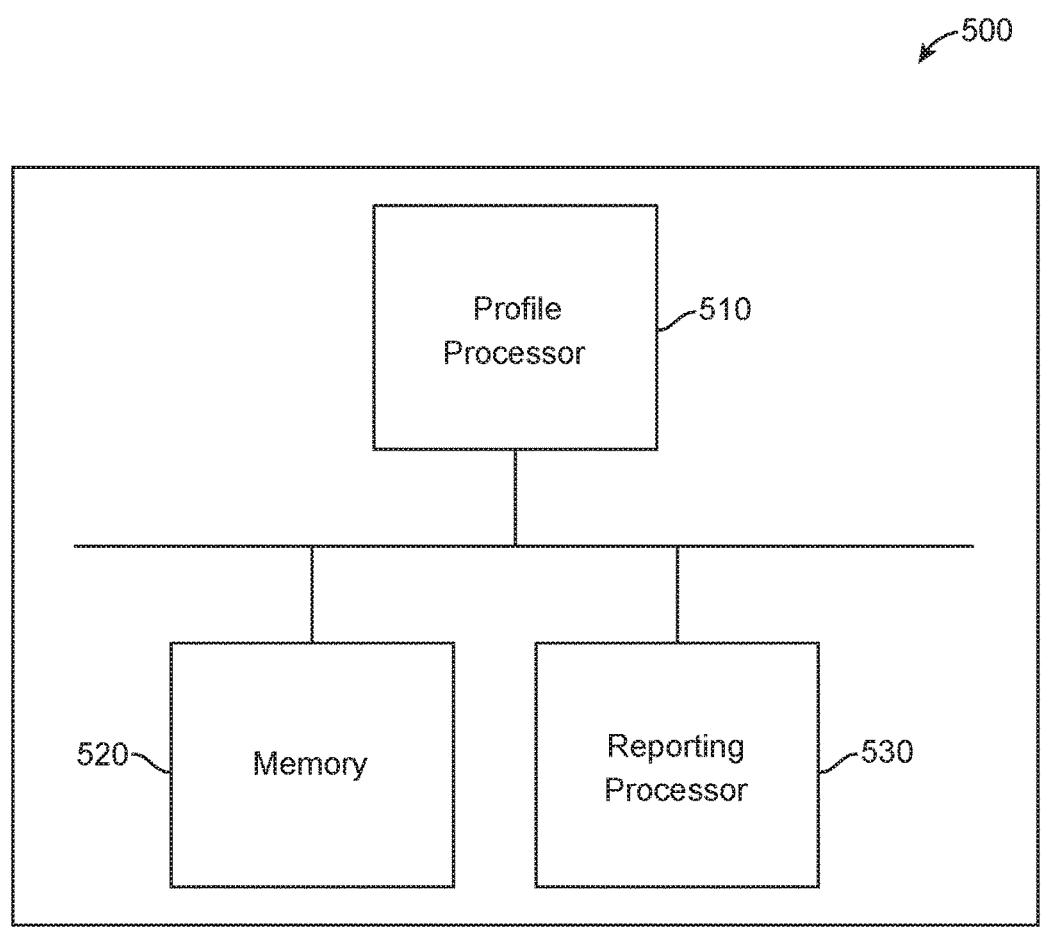
FIG. 5 is a block diagram illustrating a processing system for SAP profile compare and analytics, according to an embodiment

FIG. 5 is a block diagram illustrating a processing system 500 (e.g., a computing system hardware processor device, a multiprocessor, spreadsheet system processor, filing system processor, etc.) for profile (e.g., SAP profiles) compare, analytics and feedback, according to one embodiment. In one embodiment, the system 500 includes a profile processor 510, a memory (storage device) 520 and a reporting processor 530.

The system 500 stores and receives profiles (e.g., SAP profiles) that include SAP system settings defining role, sub-roles, user access and parameters that ultimately constrain the view and authorization across the highly complex web of enterprise data and function within SAP from the memory 520. A role is a specific user responsibility and includes the authorizations allowed for that type of user. In one example, a buyer has one set of responsibilities and system authorizations; a crib attendant has a different set of responsibilities and system authorizations. A sub role is a set of authorizations within a specific role—these provide even more detailed variations in authority defining more subtle differences, such as between authorized levels in an organization. In one example, a user may have several sub roles identified within their role—a buyer may have international authority; if they are a supervisor they may be allowed to authorize a higher dollar amount; if they are in a certain role they may be authorized for controlled chemicals, etc. It should be noted that SAP profiles are complex and must be accurate to ensure the thought processes are solving the need.

In one embodiment, the profile processor 510 performs a compare of two profiles. The compare may be performed on line per line or per data for the profiles being compared. In one example, the profile processor 510 performs the compare, at the detail level, user role authorizations (or profile details). The profile processor may provide the comparison between the specification (e.g., an SAP standard specification) and a new profile built by a security team that enters these profiles into the SAP system and each environment (e.g., development, test and production). The Security Team is the separation of duty group that makes changes to the profiles, per compliance regulations. In one example, the profile processor provides a compare between compare a baseline "now" profile with a "to be" profile prior to entry by the security team to verify accuracy and the purpose of the new profile generation or change. In one example embodiment, the profile processor 510 filters out unnecessary comparisons of SAP profile information or data (e.g., profile name differences), which could cloud a generated report data structure with unnecessary indications (e.g., highlighted lines of information or data, etc.). In another embodiment, the profile processor 510 selectively filters our comparisons of predetermined selected information for a focused comparison of particular data while avoiding comparison of the selected data.

In one embodiment, the profile processor 510 provides a comparison between an original SAP profile and a changed SAP profile, between a changed SAP profile submitted for entry to the security team and an updated SAP profile received from the memory 520 as a secured entry, between two different SAP profiles, etc.

In one embodiment, the profile processor may compare the information between profiles based on an application or process that compares each object, character, number, bit, byte, etc. to determine if a difference occurs in a particular section or information that follows specific headers, titles, or a particular portion of a data structure for a profile. In one example, the profile processor 510 determines one or more errors, discrepancies and authorization indications from performing the compare process.

In one embodiment, the reporting processor 530 obtains the results of the comparison performed by the profile processor 510 and generates a reporting data structure that includes a visual line-by-line result of the compare process. In one embodiment, the reporting data structure may include a record with a highlighted line or data of the two profiles shown in a side-by-side comparison, which facilitates the identification of the differences between compared profiles. In one example, the reporting processor validates the results of the compare process.

In one embodiment, the reporting data structure is a compare template data structure that includes a record(s) from the first profile and the second profile placed side-by-side where each record indicates the visual line-by-line result of the comparing process.

In one embodiment, the reporting processor 530 tracks changes based on the comparison process results and stores the tracked changes in the memory 520 (e.g., a log, a spreadsheet, etc.). In another embodiment, the reporting processor generates a profile standardization data structure for secure SAP profile entry submission. In one example, the profile standardization data structure is a compiled and finished draft that is submitted to the security team.

One or more embodiments facilitate the comparison between the various SAP profiles at various stages, which otherwise is a very tedious and labor intensive process that often has mistakes that have to go through a complete standard process of checking for error, discrepancy, and authorization indication. When hundreds and thousands of records have to be compared, the one or more embodiments cuts down the time involved in preforming a manual comparison by hours and days. The generation of the compare template data structure facilitates the comparison processing of SAP profiles such that any difference can readily be found, corrected and a profile standardization data structure is generated to facilitates the process for the entry by the security team.

Figure 6:
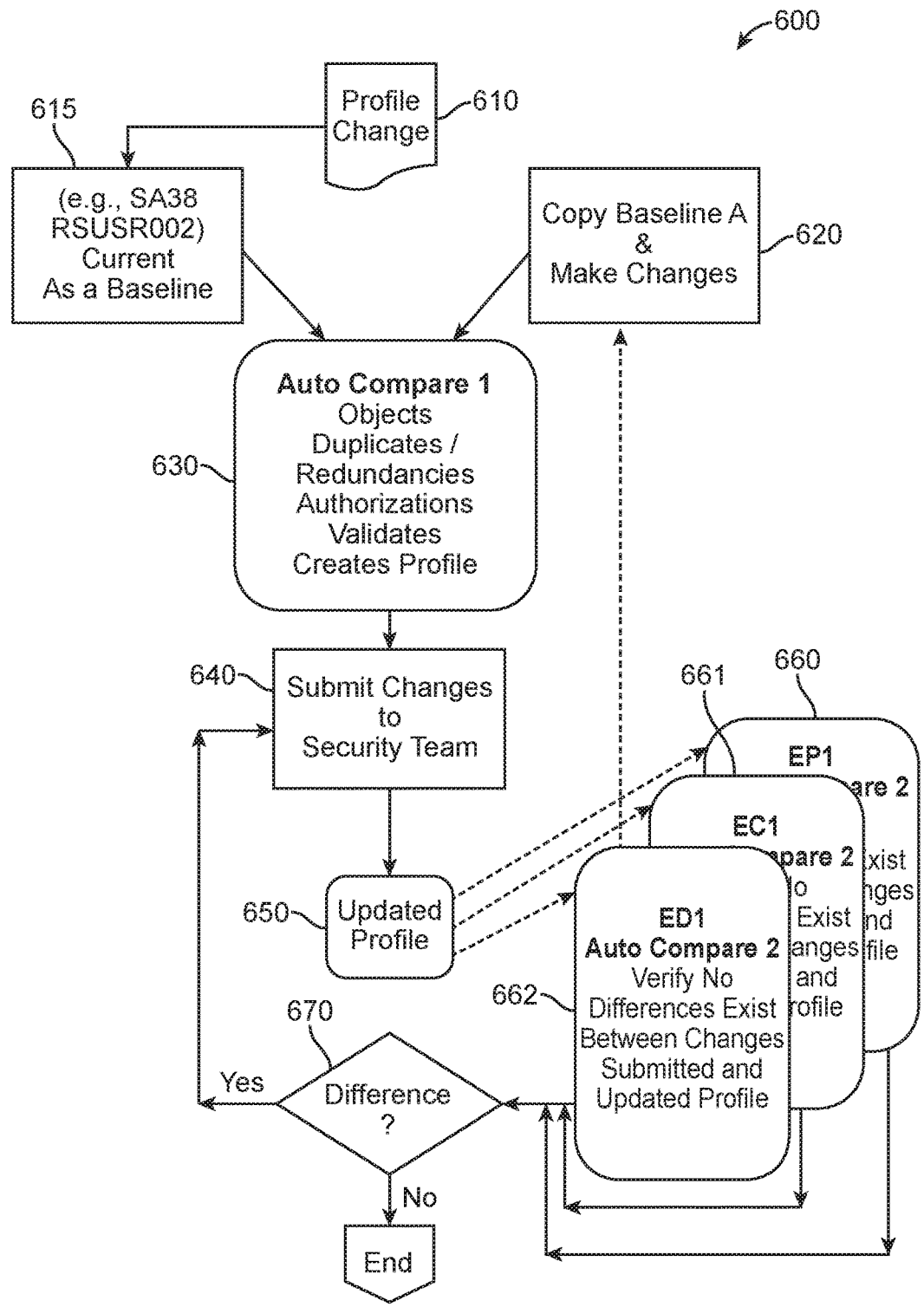
FIG. 6 shows a flow diagram for a process for SAP profile compare and analytics, according to one embodiment.

FIG. 6 shows a flow diagram 600 for a process for profile compare and analytics, according to one embodiment. In block 610 a complex profile (e.g., an SAP profile) change is needed or required. In block 615 the profile that needs to be changed is obtained or received from a memory (e.g., memory 520 (FIG. 5)) and is used as the current baseline profile. In block 620, a copy of the baseline profile from block 615 is copied and changes are made to the copy of the baseline profile. In block 630, the baseline profile form block 615 and the modified profile are input for a comparison process. In one example, the comparison process is similar as described above with reference to the profile processor 510 (FIG. 5) and the reporting processor 520. Based on the comparison process and a resulting compare template data structure, a resulting profile standardization data structure is generated. In block 640 the resulting profile standardization data structure is submitted to the security team (with or without the compare template data structure).

In block 650, the security team enters the changes, generates the updated profile 661 (e.g., EC1), where the original version of ED1 662 may be further tested to ensure proper definition of profiles, versus the compare, and may be updated until correct if need be (based on testing function and validation). The updated profile is then transported from ED1 662 to EC1 661 and then to EP1 660. In one embodiment, the updated profile at block 650 is always transported up to production 660. The development profile 662, the testing profile 661 and the production profile 660 are SAP transported versions of the updated profile at 650.

In block 670 it is determined if there are any differences between changes submitted and the updated profile. If there are no differences, the process 600 ends. Otherwise, process 600 proceeds back to block 640.

Figure 7:
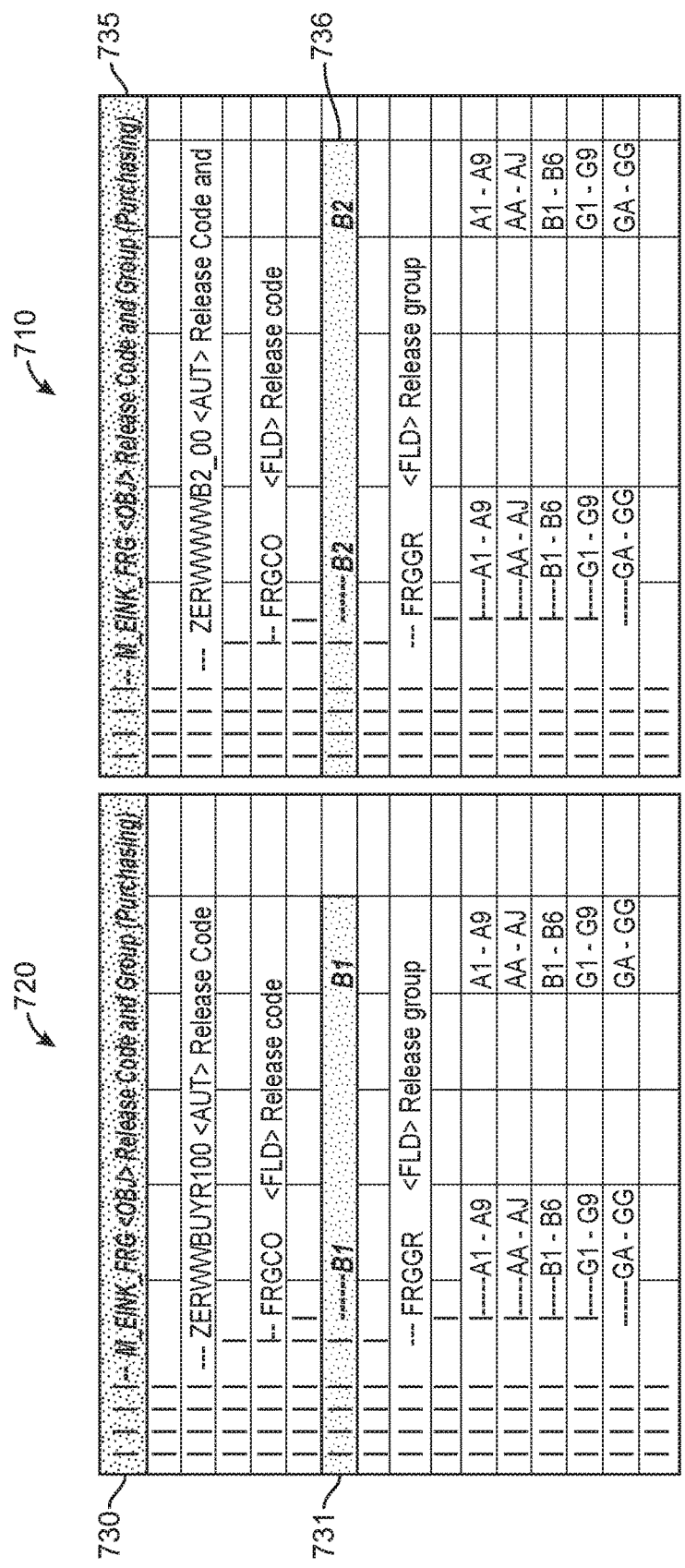
FIG. 7 shows an example result of a line-by-line comparison of SAP profiles, according to one embodiment.

FIG. 7 shows an example result of a line-by-line comparison of complex profiles (e.g., SAP profiles), according to one embodiment. In one example, the records 710 and 720 are generated as a compare template data structure and are situated in a side-by-side fashion in order to facilitate the comparison. In one example, highlighting (e.g., via a particular color) is added to the records 710 and 720 and shown as corresponding lines 730 and 735, and 731 and 736. The highlighted lines mark the portion of the records that have a difference. In another embodiment, different color highlighting may be used to mark different portions of the profile records or for different levels of importance of the information included in the records.

Figure 8:
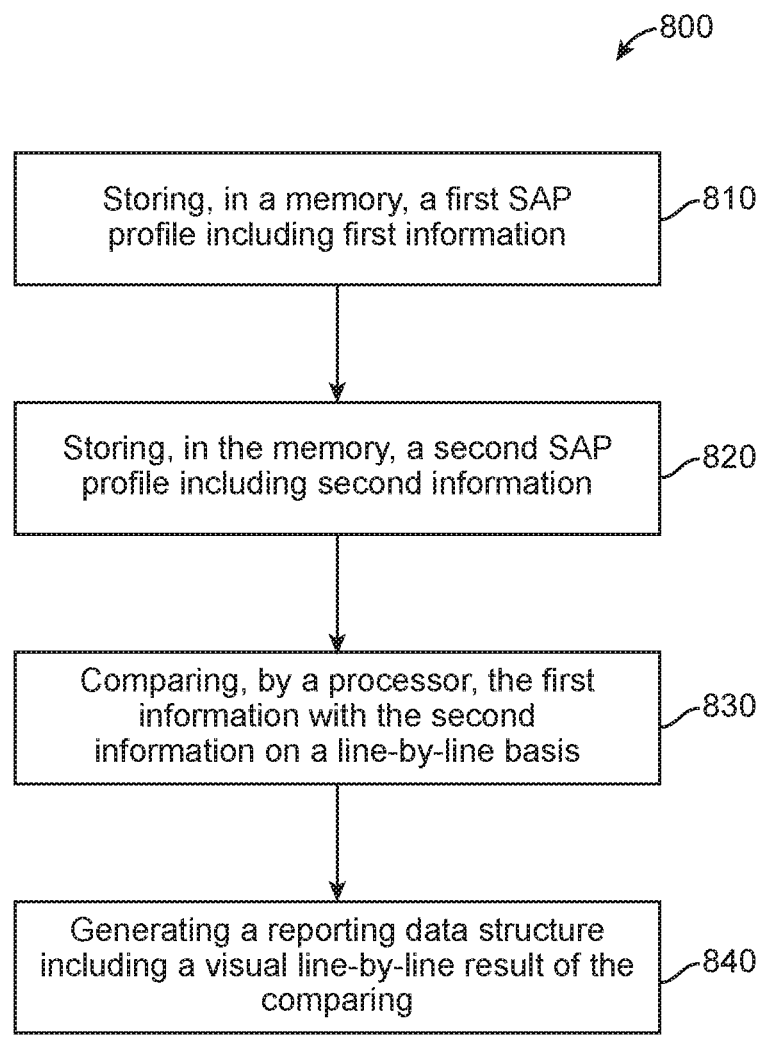
FIG. 8 shows a block diagram for a process for SAP profile compare and analytics, according to one embodiment.

FIG. 8 shows a block diagram for a process 800 for complex profile (e.g., SAP profile) compare and analytics, according to one embodiment. In block 810 process 800 includes storing, in a memory (e.g., memory 520), a first SAP profile including first information (e.g., a baseline SAP profile). In block 820 process 800 includes storing, in the memory, a second SAP profile including second information (e.g., a copied version of the baseline SAP profile that has been modified with changes). In block 830 process 800 performs comparing, by a processor (e.g., profile processor 510), the first information with the second information on a line-by-line basis. In block 840 the process 800 includes generating a reporting data structure (e.g., via the reporting processor 520) including a visual line-by-line result of the comparing. In one embodiment, the visual line-by-line result additionally shows missing or additional objects or lines of data while maintaining alignment of the remaining compared lines.

In one embodiment, the first information and the second information each include system settings and parameters. In process 800 the visual line-by-line result may include highlighting of one or more errors, discrepancies and authorization indications. In one example, the comparing of process 800 may include a compare process of information between: an original SAP profile and a changed SAP profile, a changed SAP profile submitted for entry and an updated SAP profile received as a secured entry, or two different SAP profiles. The compare process 800 may identify and eliminate redundant profiles that may have transformed over time.

In one embodiment, process 800 may provide that the first SAP profile and the second SAP profile each include an SAP profile instance associated with development, test or production. Process 800 may further include filtering the first information and the second information to avoid unnecessary comparison of particular type of data, tracking profile changes based on comparison results, and generating a profile standardization data structure for secure SAP profile entry submission. Process 800 may provide that the reporting data structure is a compare template data structure including the first profile and the second profile placed side-by-side and each indicating the visual line-by-line result of the comparing.

One or more embodiments provide verification of profile information accuracy and the purpose of the new profile generation or change. The comparison processing is automatic and the reporting data structure facilitates SAP profile processing and decreases the comparison time (e.g., from days to minutes), verification time, and secure profile change process. One or more embodiments provide an audit trail by tracking the changes in SAP profiles. In another embodiment, since copies of the baseline SAP profiles may be changed, tracking of what changes were made, when they were made, and who made them facilitates SAP profile processing and verification, where the profile processing may back-track through changes to find particular changes, dates, times, what is changed, etc.

As will be appreciated by one skilled in the art, aspects of the present invention may be embodied as a system, method or computer program product. Accordingly, aspects of one or more embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of one or more embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to one or more embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiments that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain principles and the practical application, and to enable others of ordinary skill in the art to understand the invention for various embodiments with various modifications as are suited to the particular use contemplated.

What is claimed is:

1. A method comprising:
    storing, in a memory, a first Systems, Applications, Products (SAP) profile data structure including first information;
    storing, in the memory, a second SAP profile data structure including second information;
    filtering the first information and the second information to avoid unnecessary comparison of particular type of data and to focus on predetermined selected information;
    comparing, by a processor, the first information with the second information on a line-by-line basis that includes comparison of each character and each number;
    tracking, based on comparison results, SAP profile changes comprising record changes, time of the record changes and responsible party that made the record changes;
    generating an SAP profile standardization data structure for secure SAP profile entry submission; and
    generating a reporting data structure including records from the first SAP profile data structure and the second SAP profile data structure for a visual line-by-line result of the comparing, wherein the reporting data structure comprises a compare template data structure including the first SAP profile data structure and the second SAP profile data structure placed side-by-side and each indicating the visual line-by-line result of the comparing.

2. The method of claim 1, wherein the first information and the second information each comprising system settings and parameters, and the comparing comprises a comparison of each bit or byte of data.

3. The method of claim 1, wherein the visual line-by-line result includes highlighting of one or more errors, discrepancies and authorization indications for a side-by-side visual comparison of the first SAP profile data structure and the second SAP profile data structure.

4. The method of claim 3, wherein the comparing comprises a compare of information between:
    an original SAP profile data structure and a changed SAP profile data structure;
    a changed SAP profile data structure submitted for entry and an updated SAP profile data structure received as a secured entry; or
    two different SAP profile data structures.

5. The method of claim 4, wherein the first SAP profile data structure and the second SAP profile data structure each comprise an SAP profile instance associated with development, test or production.

6. A computer program product for enterprise profile analytics, the computer program product comprising a computer readable storage medium having program instructions embodied therewith, the program instructions executable by a processor to cause the processor to:
    store, by the processor, a first Systems, Applications, Products (SAP) profile data structure including first information;
    store, by the processor, a second SAP profile data structure including second information;
    filter, by the processor, the first information and the second information to avoid unnecessary comparison of particular type of data and to focus on predetermined selected information;
    compare, by the processor, the first information with the second information on a line-by-line basis that includes comparison of each character and each number;
    track, by the processor, based on comparison results, SAP profile changes comprising record changes, time of the record changes and responsible party that made the record changes;
    generate, by the processor, an SAP profile standardization data structure for secure SAP profile entry submission; and
    generate, by the processor, a reporting data structure including records from the first SAP profile data structure and the second SAP profile data structure for a visual line-by-line result of the comparing, wherein the reporting data structure comprises a compare template data structure including the first SAP profile data structure and the second SAP profile data structure placed side-by-side and each indicating the visual line-by-line result of the comparing.

7. The computer program product of claim 6, wherein:
    the first information and the second information each comprising system settings and parameters; and
    the visual line-by-line result includes highlighting of one or more errors, discrepancies and authorization indications on a line-by-line or per data basis.

8. The computer program product of claim 7, wherein the first SAP profile data structure and the second SAP profile data structure comprise:

an original SAP profile data structure and a changed SAP profile data structure;

a changed SAP profile data structure submitted for entry and an updated SAP profile data structure received as a secured entry; or two different SAP profile data structures.

9. The computer program product of claim 6, wherein the first SAP profile data structure and the second SAP profile data structure each comprise an SAP profile instance associated with development, test or production.

10. A method comprising:

receiving a first profile data structure and a second profile data structure, the first profile data structure and the second profile data structure each including system settings, parameters and authorizations;

filtering the first profile data and the second profile data to avoid unnecessary comparison of particular type of data and to focus on predetermined selected information;

comparing, by a processor, the first profile data structure with the second profile data structure including a comparison of each character and each number on a line-by-line basis;

tracking, based on comparison results, profile data structure changes comprising record changes, time of the record changes and responsible party that made the record changes;

determining, by the processor, whether one or more errors, discrepancies and authorization indications are indicated based on a result of the comparing;

generating a Systems, Applications, Products (SAP) profile standardization data structure for secure SAP profile entry submission; and generating a compare template data structure including records from the first profile data structure and the second profile data structure placed side-by-side and each indicating a visual line-by-line result of the determining.

11. The method of claim 10, wherein the first profile data structure and the second profile data structure each comprise a SAP profile.

12. The method of claim 11, wherein the first profile data structure and the second profile data structure each comprise an SAP profile instance associated with development, test or production.

13. The method of claim 10, wherein the visual line-by-line result includes highlighting of the result on a line-by-line or per data basis.

14. The method of claim 10, wherein the comparing of the first profile data structure with the second profile data structure comprises a compare between:

an original profile data structure and a changed profile data structure;

a changed profile data structure submitted for secure entry into storage and an updated profile received from the storage as a secured entry; or two different profile data structures.

\* \* \* \* \*